L. PRUE.
ROTARY CULTIVATOR.
APPLICATION FILED MAR. 9, 1908.

905,577.

Patented Dec. 1, 1908.

2 SHEETS—SHEET 1.

WITNESSES:

INVENTOR
Louis Prue
BY
Attorneys

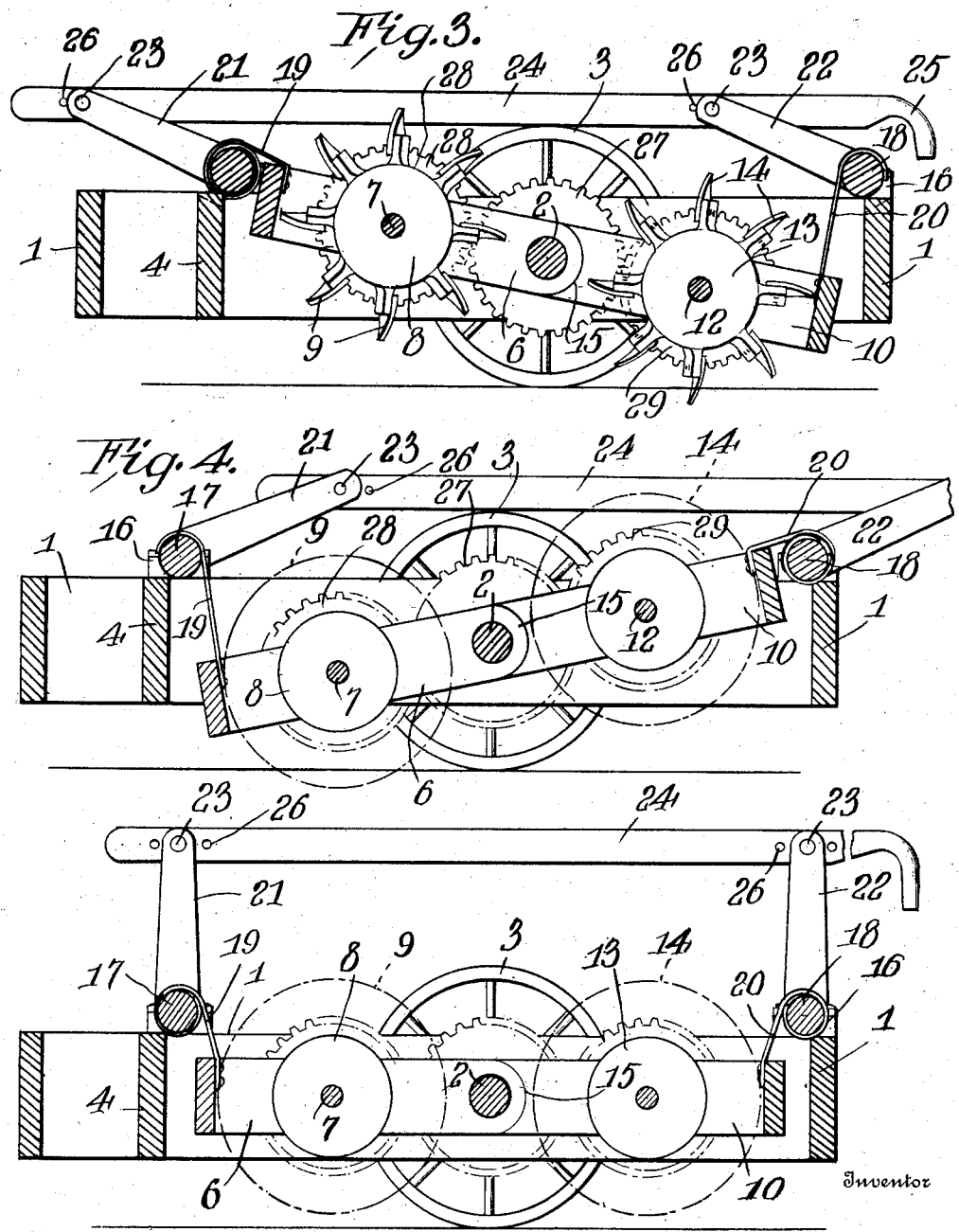

UNITED STATES PATENT OFFICE.

LOUIS PRUE, OF WABENO, WISCONSIN.

ROTARY CULTIVATOR.

No. 905,577.　　　　　　Specification of Letters Patent.　　　　　Patented Dec. 1, 1908.

Application filed March 9, 1908. Serial No. 420,047.

*To all whom it may concern:*

Be it known that I, LOUIS PRUE, a citizen of the United States, residing at Wabeno, in the county of Forest and State of Wisconsin, have invented certain new and useful Improvements in Rotary Cultivators; and I do declare the following to be a full, clear, and exact description of the invention, such as will enable others skilled in the art to which it appertains to make and use the same.

This invention relates to improvements in rotary cultivators.

The object of the invention is to provide a device of this character having sets of rotary cultivator disks operated by the supporting wheels of the machine, and having means to lower and raise said cultivators into and out of operative positions.

With this object in view, the invention consists of certain novel features of construction, combination and arrangement of parts as will be described hereinafter and particularly pointed out in the appended claims.

Figure 1:
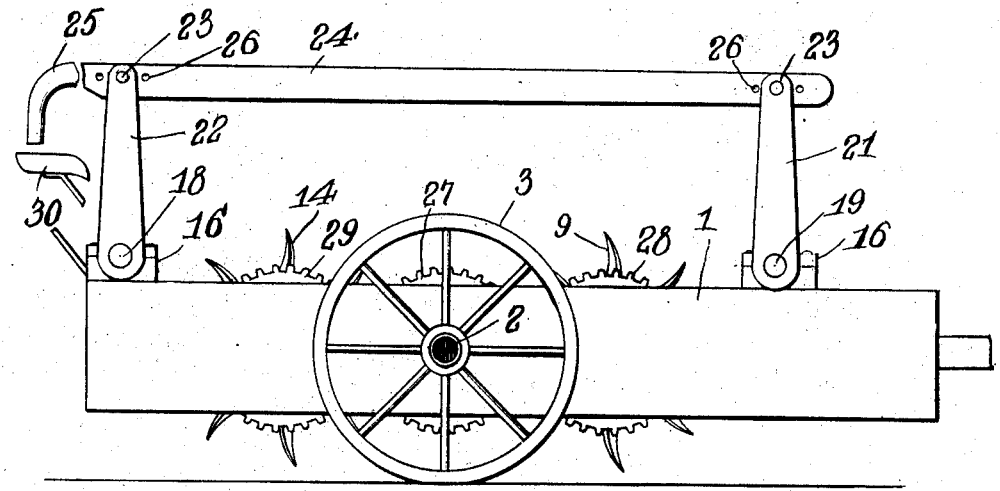
Figure 2:
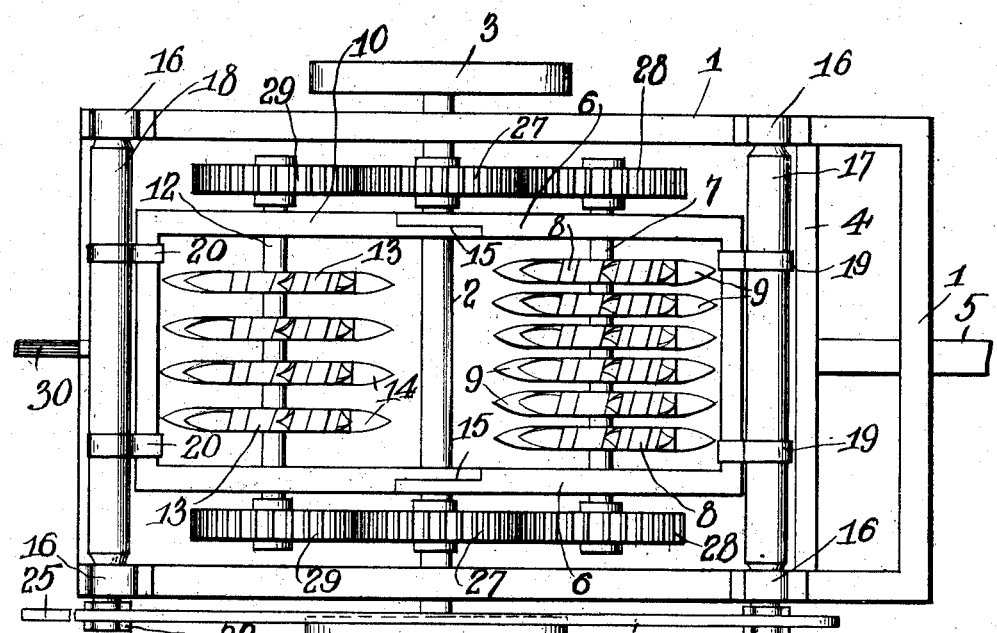

In the accompanying drawings, Figure 1 is a side view of a cultivator constructed in accordance with the invention; Fig. 2 is a top plan view of the same; Fig. 3 is a central vertical longitudinal sectional view showing the cultivator blades at one end of the machine in an operative position; Fig. 4 is a similar view showing the cultivator blades at the opposite end in an operative position; and Fig. 5 is a similar view showing the position of the parts when the cultivator blades on both ends of the machine are in an inoperative position.

Referring more especially to the drawings, 1 denotes a main supporting frame which is preferably of an oblong rectangular shape. In the frame, 1, is journaled a supporting axle, 2, on the ends of which are pivotally mounted supporting wheels, 3. In the frame 1 near its forward end is arranged a transversely disposed bar or partition, 4, and to said forward end is connected a tongue, 5, on which are arranged suitable draft devices. On the axle, 2, are pivotally mounted the inner ends of a forward cultivator supporting frame, 6, in which is revolubly mounted a transversely disposed shaft, 7, on which is arranged a series of cultivator disks, 8, said disks being provided on their outer edges with radially projecting rearwardly curved cultivator blades, 9. On the axle, 2, is also provided a cultivator supporting frame, 10, which is disposed in the rear portion of the main frame, 1, as shown. In the cultivator frame, 10, is revolubly mounted a shaft, 12, on which is arranged a series of cultivator disks, 13, said disks being provided on their outer edges with radially projecting rearwardly curved cultivator blades, 14.

The pivoted inner ends of the frames 6 and 10 are preferably recessed or notched out on their adjacent sides or faces, as shown at 15. On the upper edges of the main frame adjacent to the outer ends of the cultivator frames are arranged bearings, 16, and in the bearings on the forward end of the frame adjacent to the end of the cultivator frame 6 is journaled a winding shaft, 17, while in the bearings on the rear end of the main frame adjacent to the end of the cultivator frame, 10, is journaled a winding shaft, 18. The forward end of the cultivator frame, 6, is adjustably supported by means of straps, 19, which are connected at their lower ends to the outer end of the cultivator frame, and at their upper ends to the winding shaft, 17, whereby said shaft is turned in one direction or the other, and the straps wound or unwound, thereby raising or lowering the cultivator frame and the cultivator disks carried thereby. The rear end of the cultivator frame, 10, is adjustably supported by means of straps, 20, the upper ends of which are connected to and adapted to be wound upon the winding shaft, 18, whereby when said shaft is turned in one direction or the other, the cultivator frame and disks arranged thereon will be raised or lowered. The straps, 19 and 20 are wound upon the shafts 17 and 18, in opposite directions, as shown.

On the outer ends of the shafts, 17 and 18 are fixedly mounted forwardly projecting crank arms, 21 and 22, in the bifurcated upper ends of which are arranged pivot pins or bolts 23, by means of which said arms are adapted to be adjustably connected to the opposite ends of an operating bar, 24, on the inner end of which is formed a handle, 25. In the bar, 24, adjacent to the engagement therewith of the crank arms, 21 and 22, is formed a series of apertures or bolt holes, 26, with which the pins or bolts, 23, are adapted to be engaged to adjustably connect the upper ends of the crank arms with the operating bar.

On the supporting axle 2, between the ends of the frame 6 and 10 are fixedly mounted spur gear wheels, 27, which are adapted to engage spur gear wheels 28 and 29, fixedly mounted on the outer ends of the cultivator shafts in the outer ends of the frames 6 and 10, as shown, whereby when the axle 2 is revolved by the supporting wheels, 3, said gears, 27 will actuate the gears 28 and 29 and thereby turn the cultivator shafts and the cultivators mounted thereon. On the rear end of the main frame 1 is arranged a suitable driver's seat, 30.

In operation, when it is desired to use the cultivators, 13, the operating bar 24 is pushed forwardly, thereby rocking the crank arms 21 and 22, and partially revolving the winding shafts 17 and 18, which will cause the straps, 20, to unwind from the shaft, 18, thereby lowering the rear end of the cultivator frame 10 to cause the cultivator disks carried thereby to engage the ground. At the same time that the straps 20 are being unwound from the shaft, 18, the straps 19 are being wound up upon the shaft, 17, thereby raising the forward end of the cultivator frame, 6, and lifting the cultivator disks therein out of engagement with the ground and to an inoperative position. When it is desired to bring the cultivator disks, 8, into an operative position, the bar, 24, is pulled back or rearwardly, thus swinging the arms 21 and 22 in a reverse direction or toward the rear end of the machine, which will revolve the shafts 17 and 18 in the opposite direction, which will cause the cultivator supporting straps, 20, to be wound up upon the shaft 18, while the cultivator supporting straps will be unwound from the shaft, 17, thus permitting the cultivator frames 6 to lower, and the cultivator disks thereon to be engaged with the ground. By moving the operating bar to a position in which the crank arms are held in a vertical position, the cultivator arms will be held up in a position where the cultivator disks at both ends of the machine are out of engagement with the ground, or in an inoperative position. By providing the series of apertures, 26, in the opposite ends of the bar, 24, the upper ends of the crank arms 21 and 22 may be adjustably connected therewith, which adjustment will vary the initial position of the shafts, 17 and 18, thus providing for an increased adjustment of the cultivator frames to cause the cultivators carried thereby to work the soil deep or shallow, as may be desired. The geared connection between the cultivator shafts at each end of the machine and the main supporting axle will cause the cultivator disks to be revolved in the proper direction when the machine is drawn over the ground.

Having thus described my invention, what I claim as new and desire to secure by Letters-Patent, is:

1. In a rotary cultivator, a wheeled supporting frame, a pair of oppositely-projecting, pivotally-mounted cultivating frames, a series of cultivating disks operatively mounted in said frames, operating gears whereby said cultivating disks are operated by the supporting wheels, winding shafts, adjusting straps to connect said cultivating frames with said winding shafts, crank arms on said shafts, an operating bar, and means whereby said arms are adjustably connected to said bar, substantially as described.

2. In a machine of the character described, a main supporting frame, a supporting axle journaled in said frame, supporting wheels fixedly mounted on the outer ends of said axle, oppositely projecting cultivator frames pivotally mounted at their inner ends on said axle, shafts journaled in the outer ends of said frames, a series of cultivator disks mounted on the shafts in said frames, gear wheels mounted on the outer ends of said cultivator shafts, gear wheels fixedly mounted on said axle to engage the gears on said cultivator shafts whereby the same are operated, winding shafts revolubly mounted on said main frame, adjusting straps connected to the outer ends of said cultivator frames and to said winding shafts whereby said frames are raised and lowered when said shafts are revolved in one direction or the other, crank arms on the outer ends of said winding shafts, and an operating bar adapted to connect the upper ends of said crank arms whereby the same are moved in unison, said bar having formed therein a series of bolt holes whereby said crank arms may be adjustably connected therewith, substantially as described.

In testimony whereof I have hereunto set my hand in presence of two subscribing witnesses.

LOUIS $\overset{\text{his}}{\times}$ PRUE.
mark

Witnesses:
BENJ. L. DAWSON,
J. E. HIMLEY.